United States Patent
Kakimoto et al.

(10) Patent No.: US 8,130,617 B2
(45) Date of Patent: Mar. 6, 2012

(54) METHOD OF CONTROLLING PLAYBACK CONDITION, OPTICAL DISK, OPTICAL DISK DRIVE DEVICE AND PROGRAM

(75) Inventors: Hiroya Kakimoto, Gunma (JP); Hidenori Somei, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 573 days.

(21) Appl. No.: 12/242,530

(22) Filed: Sep. 30, 2008

(65) Prior Publication Data
US 2009/0122665 A1 May 14, 2009

(30) Foreign Application Priority Data
Oct. 2, 2007 (JP) .................................. 2007-258731

(51) Int. Cl.
*G11B 7/00* (2006.01)
(52) U.S. Cl. ................ 369/53.31; 369/53.37; 369/53.27
(58) Field of Classification Search .......................... None
See application file for complete search history.

(56) References Cited

U.S. PATENT DOCUMENTS

| | | | | |
|---|---|---|---|---|
| 6,075,921 A | * | 6/2000 | Nakagawa | ..................... 386/241 |
| 6,411,591 B1 | * | 6/2002 | Moritani et al. | ............ 369/275.2 |
| 2003/0202442 A1 | * | 10/2003 | Kubota et al. | ............... 369/47.53 |
| 2005/0058053 A1 | * | 3/2005 | Ueno et al. | ..................... 369/116 |
| 2006/0221787 A1 | | 10/2006 | Kitagaki et al. | |
| 2007/0247988 A1 | | 10/2007 | Kikukawa et al. | |

FOREIGN PATENT DOCUMENTS

| | | |
|---|---|---|
| JP | 2003-006941 A | 1/2003 |
| JP | 2006-309921 | 11/2006 |

* cited by examiner

*Primary Examiner* — Thang Tran
*Assistant Examiner* — Huy Nguyen
(74) *Attorney, Agent, or Firm* — Law Office of Katsuhiro Arai

(57) ABSTRACT

Playback durability of a writable optical disk is ensured. A method of controlling a playback condition includes continuously irradiating an optical disk with a laser beam having a power level lower than a mark formation level and detecting a change of a state of a signal caused by a return light from the optical disk, and setting a playback condition for the optical disk according to the change of the state of the signal. The playback durability of the optical disk can be ensured by adaptively controlling the playback condition as stated above.

7 Claims, 10 Drawing Sheets

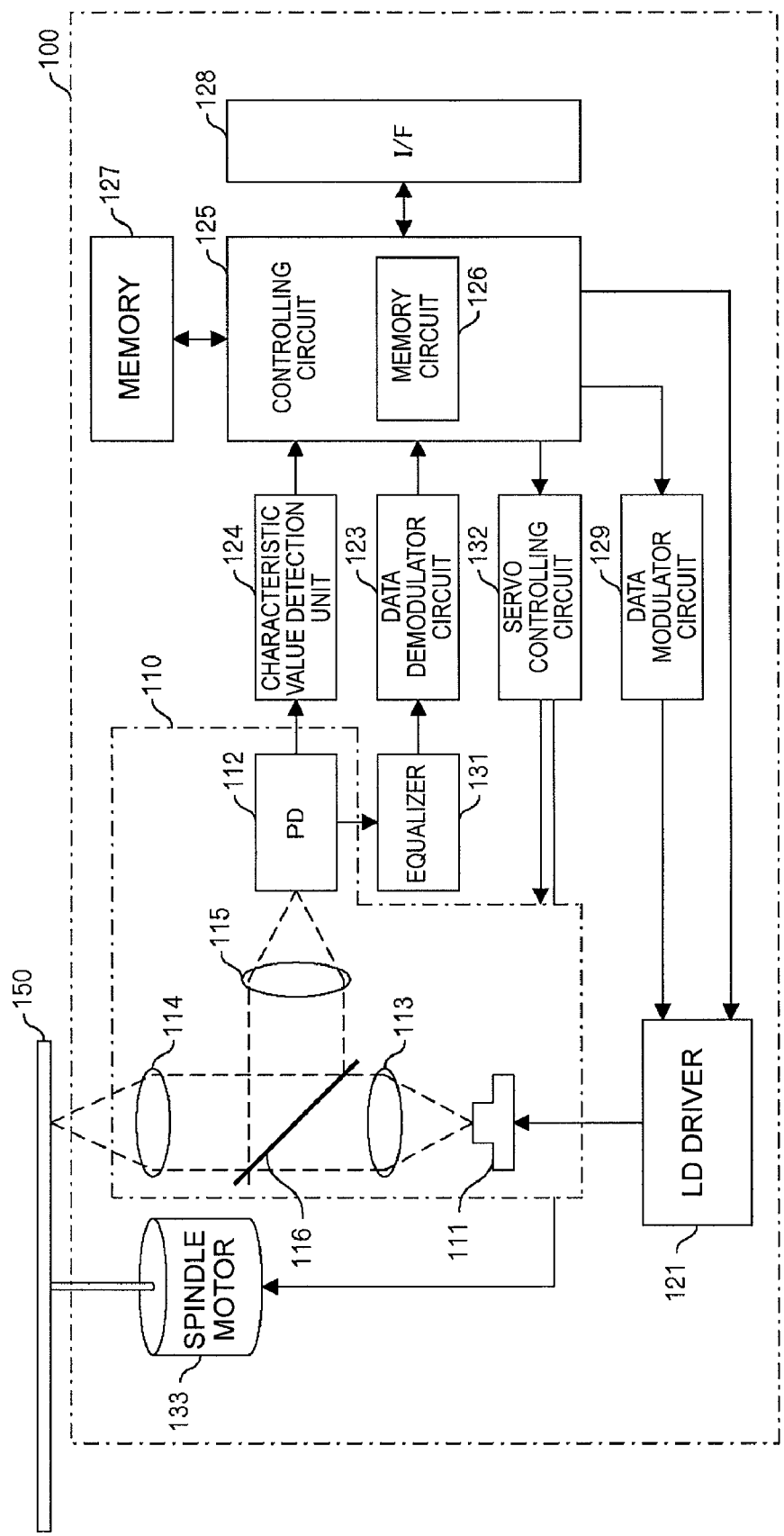

[FIG. 2]
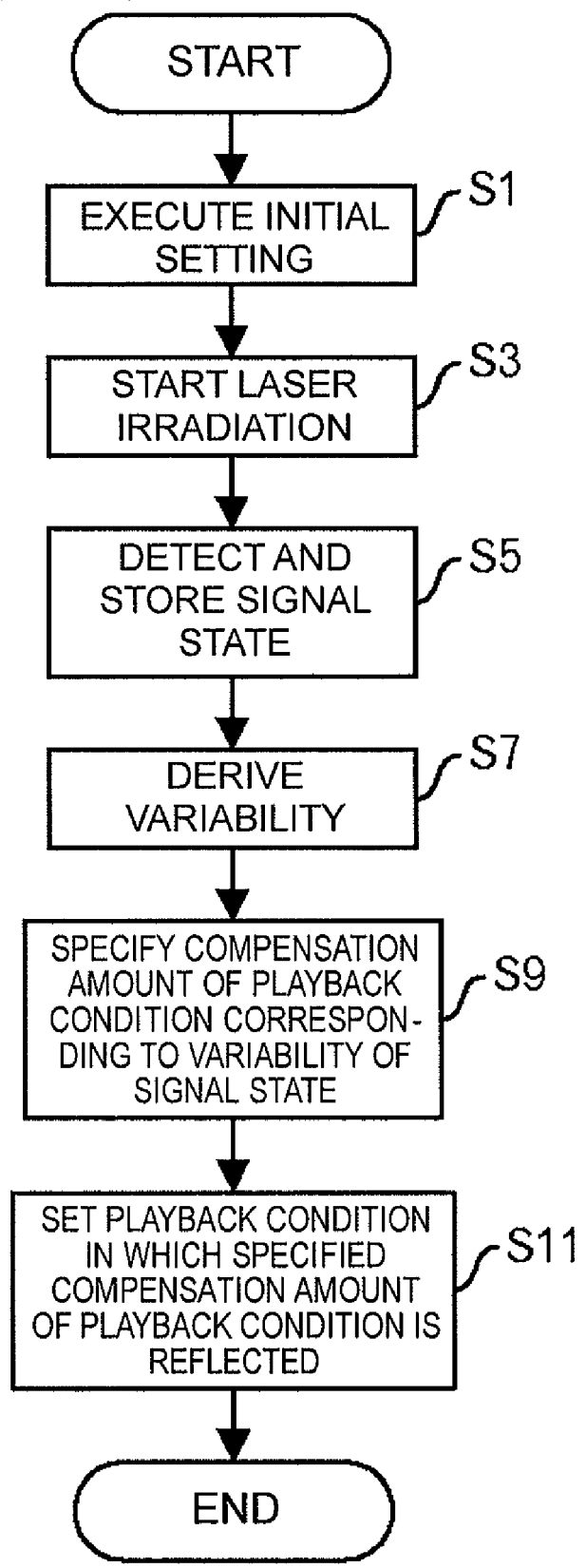

[FIG. 3]
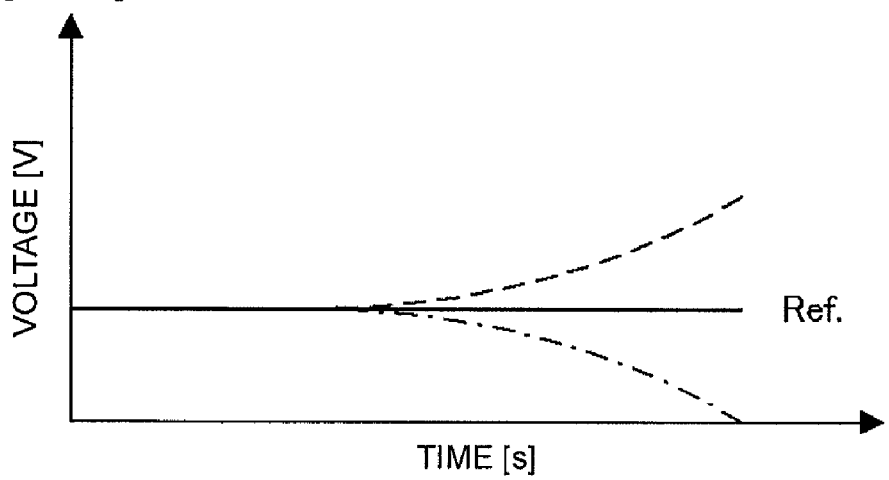
[FIG. 4]
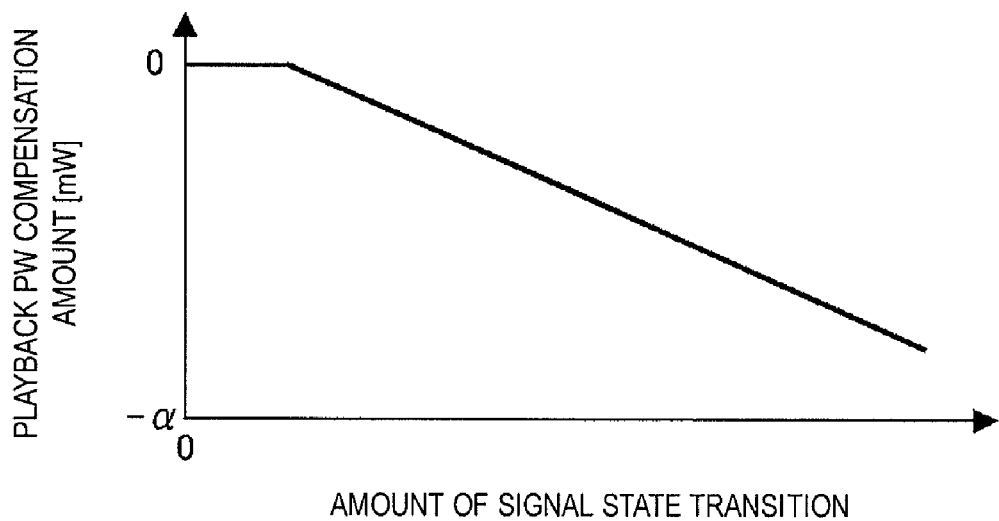
[FIG. 5]
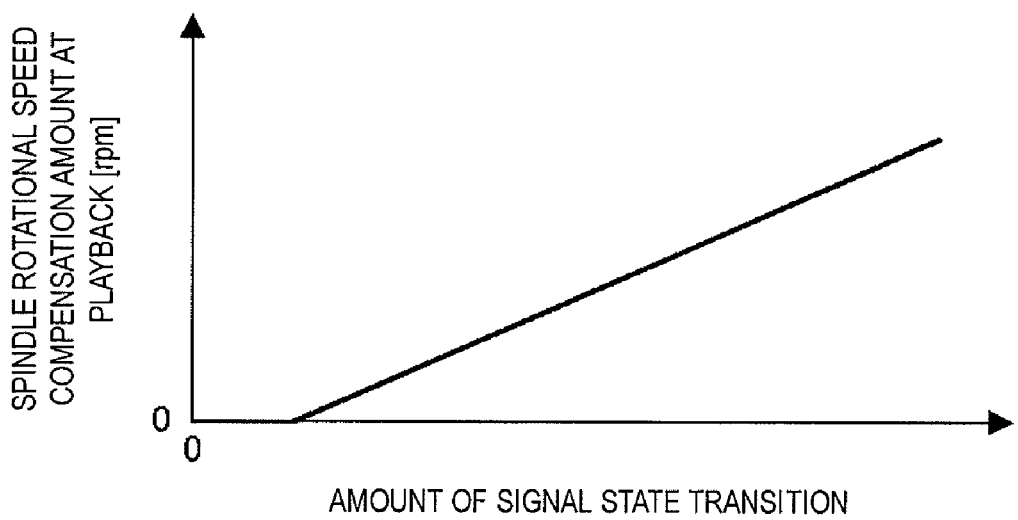

[FIG. 6]
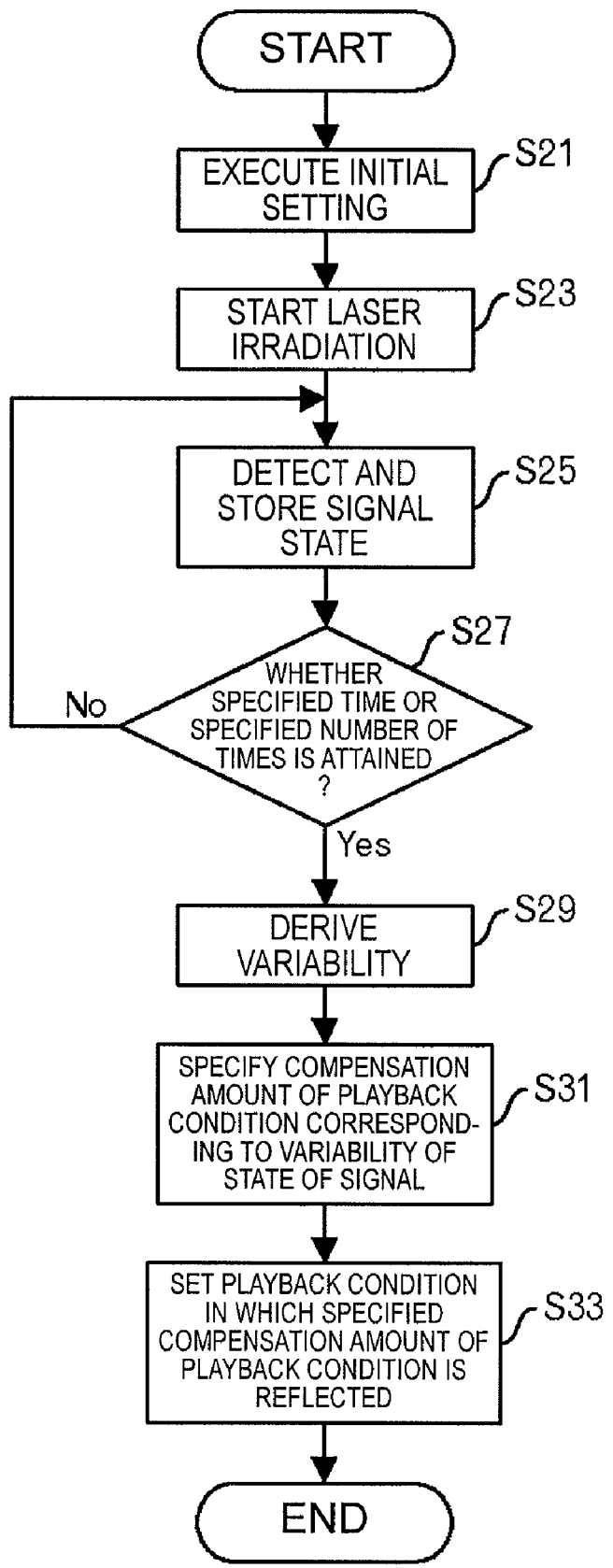

[FIG. 7]
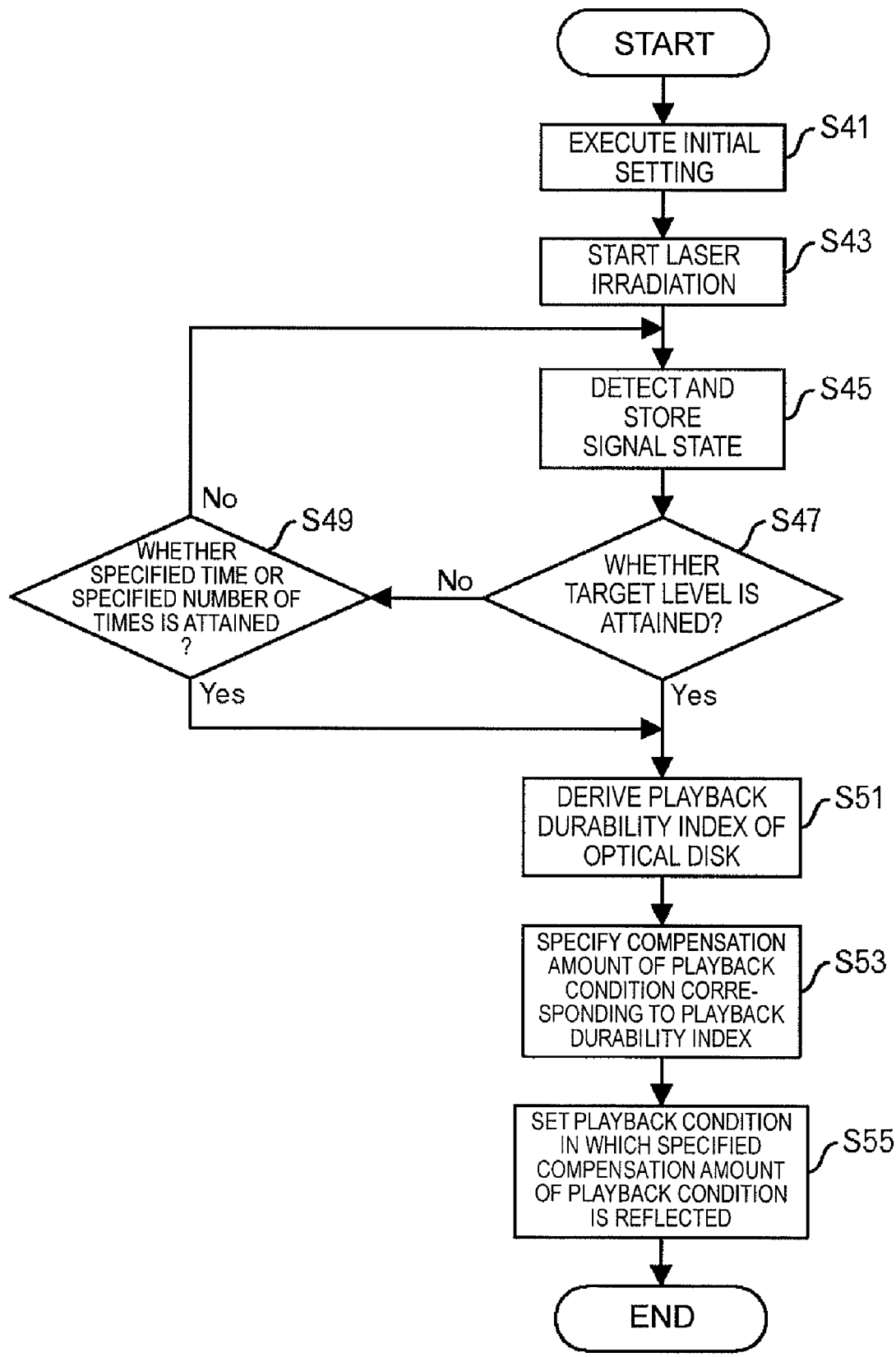

[FIG. 8]
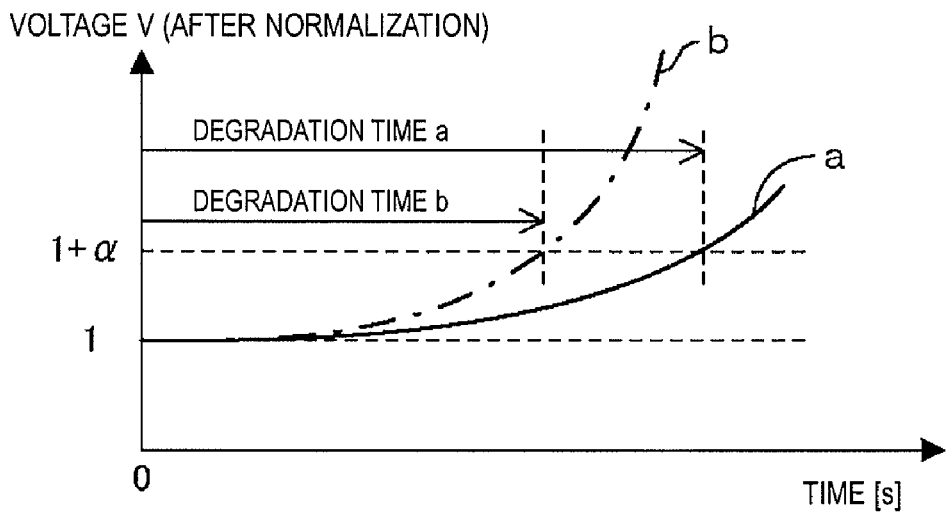
[FIG. 9]
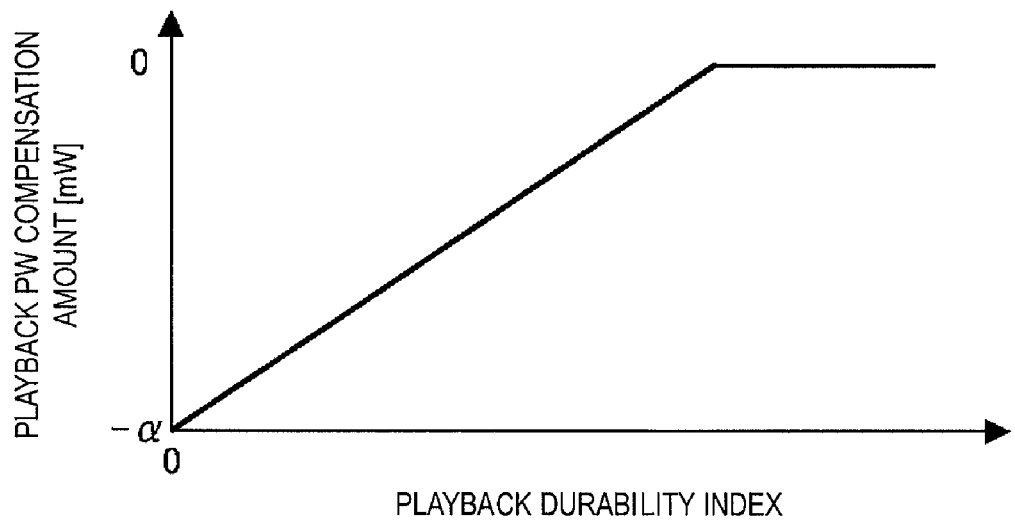
[FIG. 10]
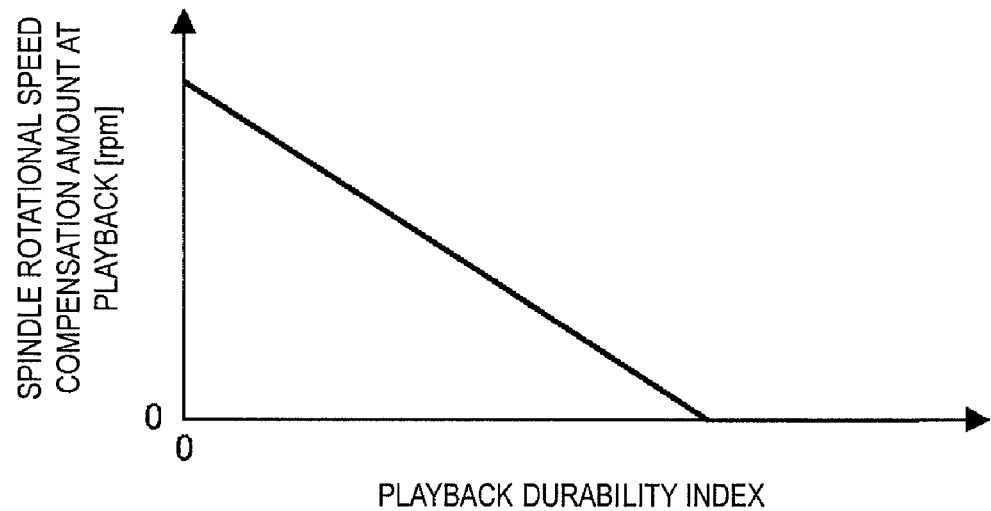

[FIG. 11]
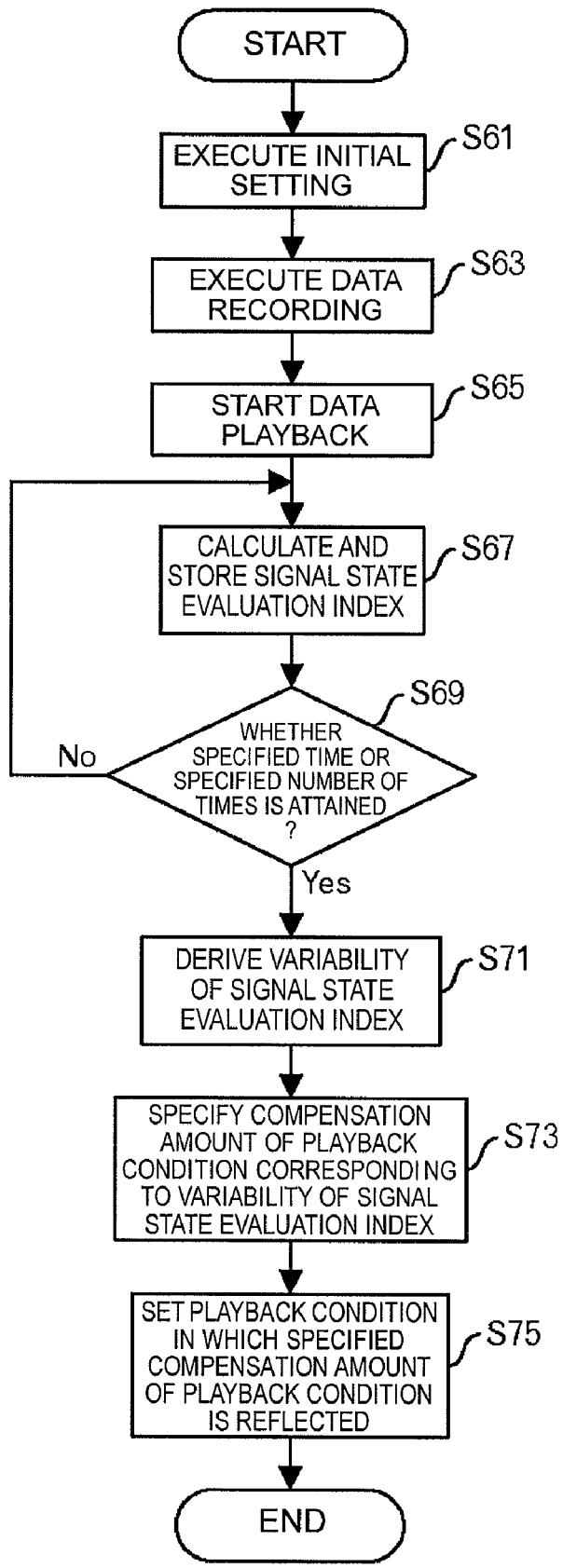

[FIG. 12]
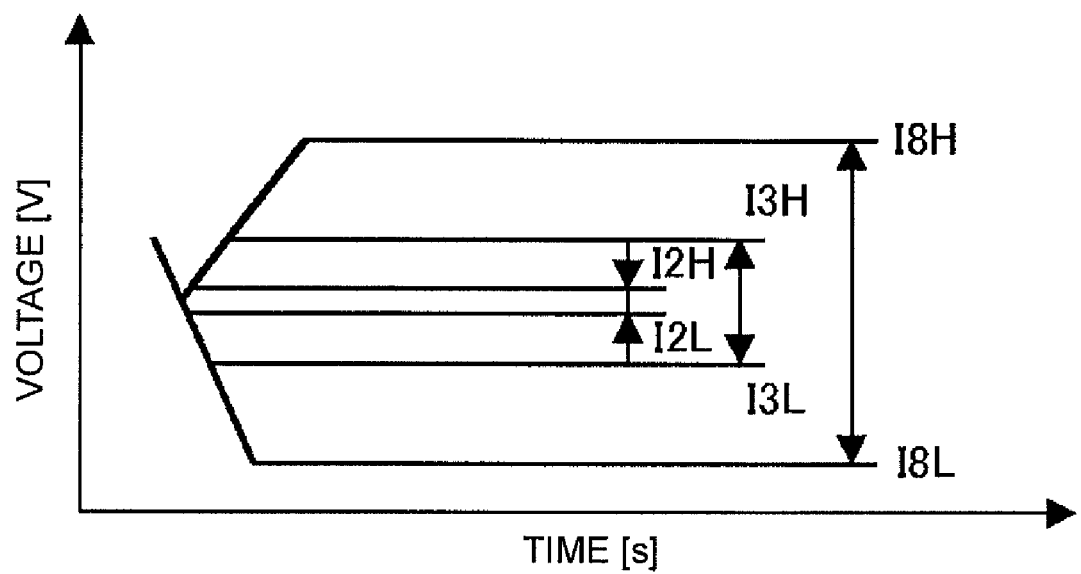

[FIG. 13]
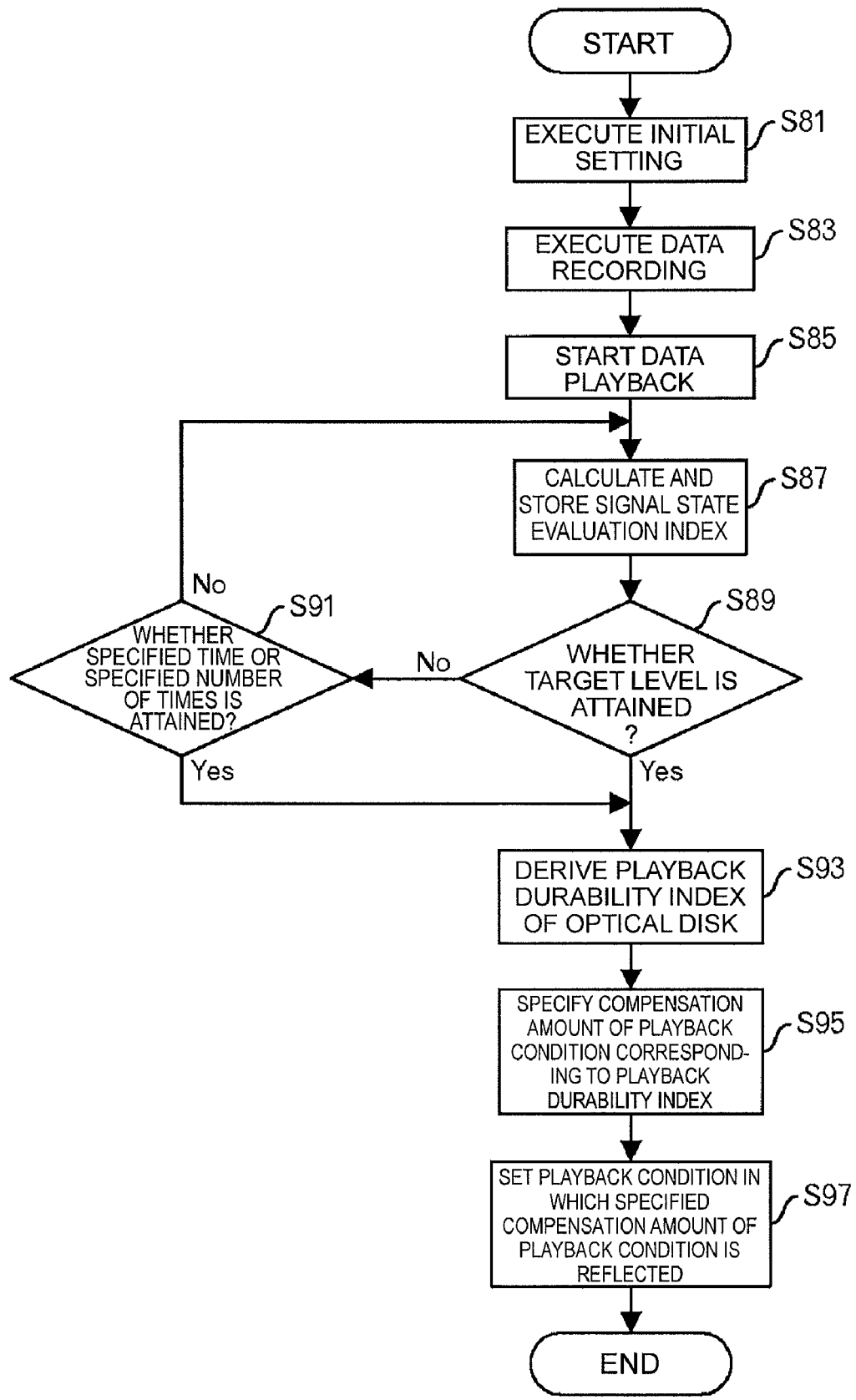

[FIG. 14]
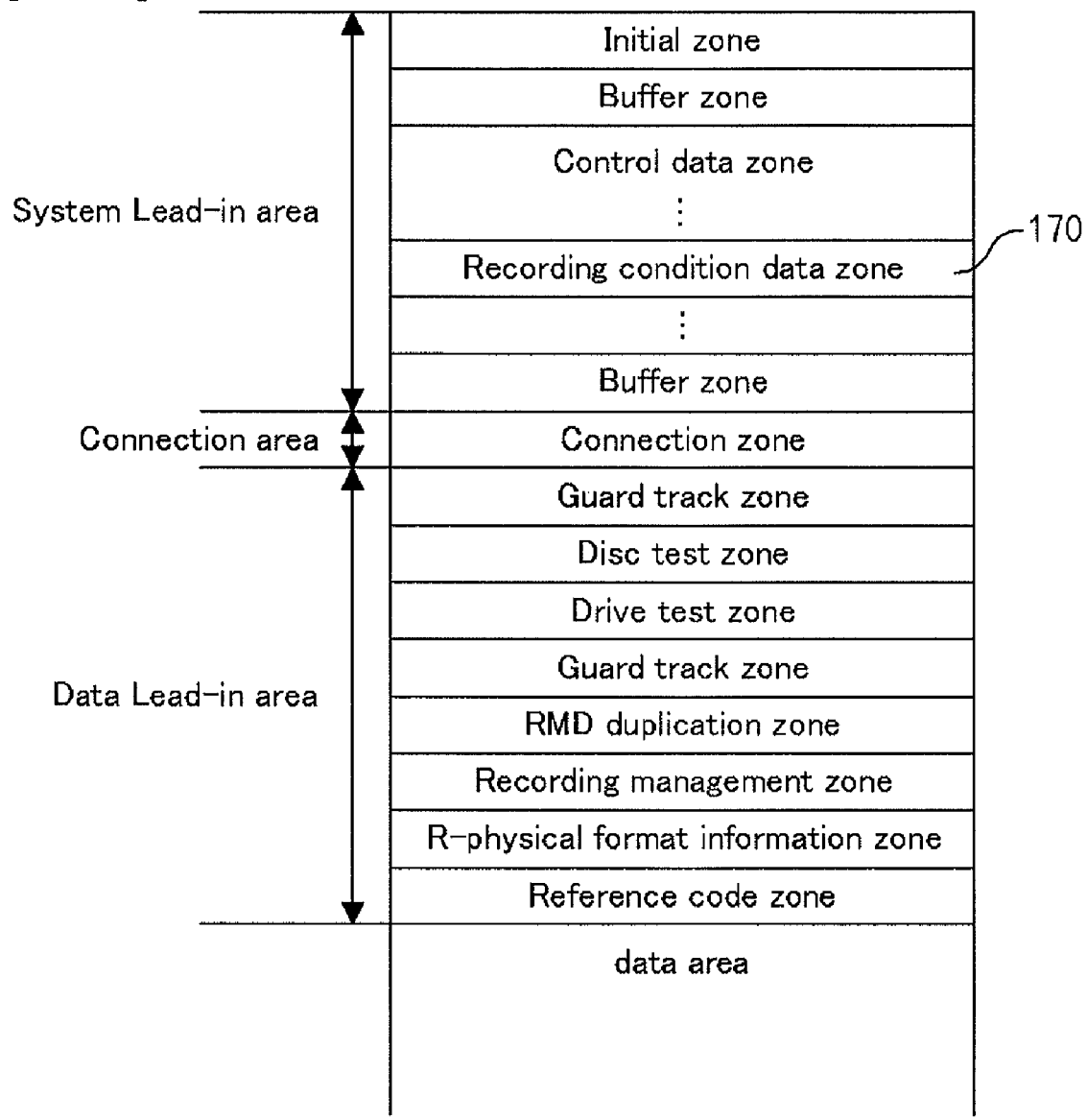

METHOD OF CONTROLLING PLAYBACK CONDITION, OPTICAL DISK, OPTICAL DISK DRIVE DEVICE AND PROGRAM

BACKGROUND OF THE INVENTION

1. Field of the Invention

The present invention relates to a technique for preventing or suppressing degradation of a recorded state of a writable optical disk in an optical disk drive device.

2. Description of the Related Art

For example, JP-A-2006-309921 discloses an evaluation method of an optical recording medium in which the evaluation of playback durability of the optical recording medium can be performed in a short time and with high precision. Specifically, an operation laser power for heating a recording layer up to a recording operation temperature is obtained; the temperature of the recording layer when a laser beam having a specified playback laser power is irradiated at data playback is obtained based on the ambient temperature at the data playback, the playback laser power and the operation laser power; a relation between the playback laser power at the data playback and a playback endurance frequency is obtained; and a relation between the temperature of the recording layer at the data playback and the playback endurance frequency is obtained from the relation between the playback laser power at the data playback and the playback endurance frequency. However, no consideration is made on measures to enable the playback while the durability is kept.

In order to play back information recorded on an optical disk, a laser beam having a playback power is irradiated to the optical disk. According to standards, the disk must withstand more than one million times laser irradiation than the playback power. Until now, no serious problem occurs in CDs and DVDs. However, when a laser of a shorter wavelength is used for a high capacity optical disk based on the Blu-ray standard or HD-DVD standard, there is a tendency that even if the amount of power output is small like the playback power as compared with the record power, the laser has the energy amount to disrupt coloring matter coupling. Thus, in a writable optical disk, the state of recorded medium becomes liable to degrade by repeated playback, and the problem of the playback durability becomes serious.

It is ideal that in combinations of all commercialized optical disk drives and optical disks themselves, sufficient playback durability is obtained, and playback degradation does not occur in any playback environment, or does not reach such a level that a problem occurs in a recording and playback system. However, actually, the lasers of the optical disk drives and the optical disks have individual variations at the time of production and due to change over lapsed time, and the change of outside environment such as temperature also has an influence. Therefore, according to the related art, it is difficult to ensure a sufficient margin.

SUMMARY OF THE INVENTION

Therefore, an object of the present invention is to provide a technique for ensuring playback durability of a writable optical disk.

According to a first aspect of the invention, a method of controlling a playback condition includes a step of continuously irradiating an optical disk with a laser beam having a power level lower than a mark formation level and detecting a change of a state of a signal caused by a return light from the optical disk, and a step of changing and setting a playback condition for the optical disk according to the change of the state of the signal. The playback condition is adaptively controlled as stated above, so that the playback durability of the optical disk can be ensured.

According to a second aspect of the invention, a method of controlling a playback condition includes a step of irradiating a track of an optical disk with a laser beam having a power level lower than a mark formation level and detecting a state of an initial signal as a state of a signal caused by a return light from the track of the optical disk, a step of continuously irradiating the track of the optical disk with a laser beam having a power level lower than the mark formation level for a specified time or a specified number of times and detecting a state of a second signal as a state of a signal caused by a return light from the track of the optical disk, a step of calculating a variation or a rate of change of a state of a signal based on the state of the initial signal and the state of the second signal, a step of using data representing a relation between a variation or a rate of change of a state of a signal and a compensation amount of a playback condition for the optical disk and specifying the compensation amount of the playback condition corresponding to the calculated variation or the rate of change of the state of the signal, and a step of setting a playback condition in which the specified compensation amount of the playback condition is reflected. As the variation or the rate of change of the state of the signal becomes large, the playback durability of this optical disk becomes low. Accordingly, when the data representing the relation between the variation or the rate of change of the state of the signal and the compensation amount of the playback condition for the optical disk is prepared, an adjustment can be made to the suitable playback condition, and the playback durability can be ensured.

According to a third aspect of the invention, a method of controlling a playback condition includes a first detection step of irradiating a track of an optical disk with a laser beam having a power level lower than a mark formation level and detecting a state of an initial signal as a state of a signal caused by a return light from the track of the optical disk, a second detection step of continuously irradiating the track of the optical disk with a laser beam having a power level lower than the mark formation level and detecting a state of a second signal as a state of a signal caused by a return light from the track of the optical disk, a step of calculating a variation or a rate of change of a state of a signal based on the state of the initial signal and the state of the second signal, a step of, when the variation or the rate of change of the state of the signal exceeds a threshold, using data representing a relation between a time or a laser irradiation frequency and a compensation amount of a playback condition for the optical disk and specifying the compensation amount of the playback condition corresponding to the time between the first detection step and the second detection step or the laser irradiation frequency, and a step of setting a playback condition in which the specified compensation amount of the playback condition is reflected. Here, the laser irradiation frequency may be the number of times the disk makes one rotation and the laser beam is repeatedly irradiated to the same position. It is understood that when the variation or the rate of change of the state of the signal exceeds the specified threshold before the laser irradiation time or the laser irradiation frequency becomes large, the playback durability of this optical disk is low. Accordingly, when the data representing the relation between the time or the laser irradiation frequency and the compensation amount of the playback condition for the optical disk is prepared, an adjustment can be made to the suitable playback condition, and the playback durability can be ensured.

According to a fourth aspect of the invention, a method of controlling a playback condition includes a step of recording data on a track of an optical disk under a recording condition, a step of irradiating the track with a laser beam having a power level lower than a mark formation level and detecting a state of an initial signal as a state of a signal caused by a return light from the track, a step of continuously irradiating the track of the optical disk with a laser beam having a power level lower than the mark formation level for a specified time or a specified number of times and detecting a state of a second signal as a state of a signal caused by a return light from the track of the optical disk, a step of calculating a variation or a rate of change of a state of a signal based on the state of the initial signal and the state of the second signal, a step of using data representing a relation between a variation or a rate of change of a state of a signal and a compensation amount of a playback condition for the optical disk and specifying the compensation amount of the playback condition corresponding to the calculated variation or the rate of change of the state of the signal, and a step of setting a playback condition in which the specified compensation amount of playback condition is reflected. For example, a code pattern is actually recorded in a test recording area, and the variation or the rate of change of the state of the signal can be acquired in an environment close to actual playback. That is, the adjustment of the playback condition can be performed more appropriately.

According to a fifth aspect of the invention, a method of controlling a playback condition includes a step of recording data on a track of an optical disk under a recording condition, a first detection step of irradiating the track with a laser beam having a power level lower than a mark formation level and detecting a state of an initial signal as a state of a signal caused by a return light from the track, a second detection step of continuously irradiating the track with a laser beam having a power level lower than the mark formation level and detecting a state of a second signal as a state of a signal caused by a return light from the track, a step of calculating a variation or a rate of change of a state of a signal based on the state of the initial signal and the state of the second signal, a step of, when the variation or the rate of change of the state of the signal exceeds a threshold, using data representing a relation between a time or a laser irradiation frequency and a compensation amount of a playback condition for the optical disk and specifying the compensation amount of the playback condition corresponding to the time between the first detection step and the second detection step or the laser irradiation frequency, and a step of setting a playback condition in which the specified compensation amount of the playback condition is reflected.

Besides, the state of the signal of the first to the third aspects of the invention may be a reflectivity level. Besides, the state of the signal of the first, the fourth and the fifth aspects of the invention may be one of a voltage level of a code in the data recording, a β value, an asymmetry value, a jitter value and an error value.

Further, the playback condition may be a level of a laser power at playback or a rotational speed of a spindle motor.

According to a sixth aspect of the invention, a method of controlling a playback condition includes a step of reading information relating to a change of a state of a signal caused by a return light from an optical disk, which is generated as a result of continuously irradiating the optical disk with a laser beam having a power level lower than a mark formation level, from a memory in an optical disk drive or the optical disk in which the information relating to the change of the state of the signal is stored, and a step of changing and setting a playback condition for the optical disk according to the information relating to the change of the state of the signal. As stated above, the information relating to the change of the state of the signal may not be calculated by the optical disk drive device, but may be read from the memory in the optical disk drive device or the optical disk. Incidentally, the playback condition in which the playback durability is considered may be read from the memory in the optical disk drive device or the optical disk and may be set.

According to a seventh aspect of the invention, an optical disk records data representing a relation between a variation or a rate of change of a state of a signal caused by a return light from an optical disk, which is generated as a result of continuously irradiating the optical disk with a laser beam having a power level lower than a mark formation level, and a compensation amount of a playback condition for the optical disk. When the optical disk as stated above is prepared, the processes as described above can be performed, the suitable playback condition is set, and the playback durability can be ensured.

According to an eighth aspect of the invention, an optical disk records data representing a relation between a time or a laser irradiation frequency, from a laser irradiation start, obtained when a variation or a rate of change of a state of a signal caused by a return light from a track, which is generated as a result of continuously irradiating the optical disk with a laser beam having a power level lower than a mark formation level, exceeds a threshold and a compensation amount of a playback condition for the optical disk.

According to a ninth aspect of the invention, an optical disk drive device includes a memory that stores data representing a relation between a variation or a rate of change of a state of a signal caused by a return light from an optical disk, which is generated as a result of continuously irradiating the optical disk with a laser beam having a power level lower than a mark formation level, and a compensation amount of a playback condition for the optical disk.

According to a tenth aspect of the invention, an optical disk drive device includes a memory that stores data representing a relation between a time or a laser irradiation frequency, from a laser irradiation start, obtained when a variation or a rate of change of a state of a signal caused by a return light from a track, which is generated as a result of continuously irradiating an optical disk with a laser beam having a power level lower than a mark formation level, exceeds a threshold and a compensation amount of a playback condition for the optical disk.

According to an eleventh aspect of the invention, an optical disk stores at least one of information relating to a change of a state of a signal caused by a return light from an optical disk, which is generated as a result of continuously irradiating the optical disk with a laser beam having a power level lower than a mark formation level, and a data playback condition for the optical disk. By doing so, the processes as described above can be performed, the suitable playback condition is set, and the playback durability can be ensured.

According to a twelfth aspect of the invention, an optical disk drive device includes a memory that stores at least one of information relating to a change of a state of a signal caused by a return light from an optical disk, which is generated as a result of continuously irradiating the optical disk with a laser beam having a power level lower than a mark formation level, and a data playback condition that is determined according to the change of the state of the signal and can prevent or suppress degradation of playback quality of the optical disk.

A program for causing a processor to execute a method of the invention can be created, and the program is stored in, for example, a storage medium or a storage device such as a flexible disk, an optical disk such as a CD-ROM, a magneto-optical disk, a semiconductor memory, a hard disk, a nonvolatile memory of a processor, or any other computer readable medium. Besides, the program may be distributed by digital signals through a network. Incidentally, the data in the middle of processing may be temporarily stored in a storage device such as a memory of a processor.

According to the invention, the playback durability of a writable optical disk can be ensured.

BRIEF DESCRIPTION OF THE DRAWINGS

FIG. 1 is a functional block diagram of a drive system of an embodiment of the invention.

FIG. 2 is a view showing a process flow in a first embodiment of the invention.

FIG. 3 is a view schematically showing a time change of a voltage level of a playback signal.

FIG. 4 is a schematic view showing a relation between an amount of signal state transition and a compensation amount of playback power.

FIG. 5 is a schematic view showing a relation between an amount of signal state transition and a compensation amount of rotational speed of playback spindle.

FIG. 6 is a view showing a process flow in a second embodiment of the invention.

FIG. 7 is a view showing a process flow in a third embodiment of the invention.

FIG. 8 is a schematic view showing a time change of a voltage level when playback degradation occurs.

FIG. 9 is a schematic view showing a relation between a playback durability index and a compensation amount of playback power.

FIG. 10 is a schematic view showing a relation between a playback durability index and a compensation amount of rotational speed of playback spindle.

FIG. 11 is a view showing a process flow in a fourth embodiment.

FIG. 12 is a view showing a voltage level of a playback signal.

FIG. 13 is a view showing a process flow in a fifth embodiment.

FIG. 14 is a view showing a data structure stored in an optical disk.

DETAILED DESCRIPTION OF THE INVENTION

Embodiment 1

A drive system of a first embodiment of the invention will be described with reference to a functional block diagram of FIG. 1. The drive system of the embodiment of the invention includes an optical disk drive device 100 and an I/O system (not shown) including a display unit such as a television set and an operation unit such as a remote controller.

The optical disk drive device 100 includes a memory 127 for storing data in the middle of processing, data of processing results, reference data in the processing, and the like, a controlling circuit 125 including a CPU (Central Processing Unit) and a memory circuit 126 for storing a program to cause a process described later to be performed, an interface unit (hereinafter abbreviated to an I/F) 128 as an interface to the I/O system, a characteristic value detection unit 124 to detect an amplitude level of an RF signal as a playback signal, an equalizer 131 and a data demodulator circuit 123 for performing a process to decode that a code of which length is read from the RF signal as the playback signal, a pickup unit 110, a data modulator circuit 129 that performs a specified modulation on data outputted from the controlling circuit 125 and to be recorded and outputs it to a laser diode (hereinafter abbreviated to an LD) driver 121, the LD driver 121, and a servo controlling circuit 132 for a rotational control unit of an optical disk 150 and a spindle motor 133 and for the pickup unit 110. Incidentally, the length of the code read from the RF signal is, for example, 2T to 8T and 9T of a synchronous code in the case of Blu-ray standards. Besides, in the case of HD-DVD standards, the length is 2T to 11T and 13T of a synchronous code.

The pickup unit 110 includes an objective lens 114, a beam splitter 116, a detection lens 115, a collimate lens 113, an LD 111, and a photo detector (PD) 112. In the pickup unit 110, a not-shown actuator is operated according to the control of the servo controlling circuit 132, and focusing and tracking are performed.

The controlling circuit 125 is connected to the memory 127, the characteristic value detection unit 124, the I/F 128, the LD driver 121, the data modulator circuit 129, the servo controlling circuit 132 and the like. The characteristic value detection unit 124 is connected to the PD 112, the controlling circuit 125 and the like. The LD driver 121 is connected to the data modulator circuit 129, the controlling circuit 125 and the LD 111. The controlling circuit 125 is connected also to the I/O system through the I/F 128.

Next, the outline of a process when data is recorded on the optical disk 150 will be described. First, the controlling circuit 125 causes the data modulator circuit 129 to perform the specified modulation processing on the data to be recorded on the optical disk 150, and the data modulator circuit 129 outputs the modulated data to the LD driver 121. Incidentally, the controlling circuit 125 controls the spindle motor 133 to rotate at a specified rotational speed through the servo controlling circuit 132. The LD driver 121 drives the LD 111 based on the received data and in accordance with a specified recording condition (strategy and parameter) and causes the laser beam to be outputted. The laser beam is irradiated to the disk 150 through the collimate lens 113, the beam splitter 116, and the objective lens 114, and forms a mark and a space on the optical disk 150. Incidentally, in this embodiment, the optical disk drive device 100 may be such that data can not be recorded.

Besides, the outline of a process when data recorded on the optical disk 150 is played back will be described. In accordance with the instruction from the controlling circuit 125, the LD driver 121 drives the LD 111 to output a laser beam. The controlling circuit 125 controls the spindle motor 133 to rotate at a specified rotational speed through the servo controlling circuit 132. The laser beam is irradiated to the optical disk 150 through the collimate lens 113, the beam splitter 116, and the objective lens 114. The reflected light from the optical disk 150 is inputted to the PD 112 through the objective lens 114, the beam splitter 116 and the detection lens 115. The PD 112 converts the reflected light from the optical disk 150 into an electric signal and outputs it to the characteristic value detection unit 124 and the like. The equalizer 131 and the data demodulator circuit 123 perform a specified decoding processing on the outputted playback signal, and outputs the decoded data to the display unit of the I/O system through the controlling circuit 125 and the I/F 128, and the playback data is displayed. The characteristic value detection unit 124 is not used in normal playback.

Next, the process of the embodiment will be described with reference to FIGS. 2 to 5. First, the user sets the optical disk 150 (optical disk on which data can be written at least once) to optical disk drive device 100. The controlling circuit 125 reads initialization information, such as a data playback position (for example, a specified track in a test area), a laser power level and a rotational speed of the spindle motor 133, previously stored in the memory 127 or the like, and sets it in the LD driver 121, the servo controlling circuit 132 and the like (step S1). Although the laser power level is set to a value lower than a recording laser power level, that is, a mark formation level, it is preferable that a value higher than a normal playback laser power level is adopted. This is for causing a change of a playback signal described later to occur in a short time. Besides, a specified code may not be written at the data playback position.

Next, the controlling circuit 125 causes the LD driver 121 to start laser irradiation to the foregoing data playback position (step S3). The laser irradiation is continuously performed. When the laser irradiation is started, a return (reflected) light from the optical disk 150 is converted into an electric signal by the PD 112, and is outputted to the characteristic value detection unit 124. The characteristic value detection unit 124 detects a state of a signal caused by the return light, and outputs it to the controlling circuit 125, and the controlling circuit 125 stores it in the memory 127 (step S5). Step S5 is performed at least twice, that is, immediately after step S3 and after a specified time elapses or laser irradiation is performed a specified number of times. However, the change mode of the state of the signal, for example, a linear type, a saturation type, or an exponential function type may be determined by performing step S5 more times.

Incidentally, when playback degradation does not occur, as shown by a solid line "Ref." in the graph of FIG. 3 (the vertical axis represents voltage level, and the horizontal axis represents time), an almost constant voltage level is detected by the characteristic value detection unit 124. The voltage level approximately represents the reflectivity level of the optical disk 150, and here, it is indicated that the reflectivity is constant. On the other hand, when the signal degradation occurs by repeated playback, the voltage level is changed. In general, when the optical disk 150 is of the Low-to-High type, the voltage level is changed to the high voltage side as indicated by a dotted line. When the optical disk 150 is of the High-to-Low type, the voltage level is changed to the low voltage side as indicated by an alternate long and short dash line. That is, the reflectivity is changed.

Incidentally, the voltage level based on the return light from the optical disk 150 may not directly be used, but another index may be calculated, and the index value may instead be used as the state of the signal.

Accordingly, the voltage level detected immediately after step S3 is stored as a state of a reference signal or a state of an initial signal in the memory 127, and it is determined what signal state is obtained after a specified time elapses.

At the time point when the detection at step S5 is ended, the controlling circuit 125 causes the LD driver 121 to end the laser irradiation. The controlling circuit 125 derives the variability of the detected state of the signal (step S7). Specifically, a difference between a first voltage level as the state of the reference signal (the state of the initial signal) and a second voltage level as a state of a signal (a second state of a signal) after the specified time elapses, that is, a variation or a rate of change is calculated. For example, the rate of change may be calculated as (first voltage level−second voltage level)/(first voltage level). Also as described above, the change mode of the state of the signal may also be determined.

Thereafter, the controlling circuit 125 specifies a compensation amount of a playback condition corresponding to the derived variability of the state of the signal (step S9). For example, a correspondence table of a variability of a state of a signal and a compensation amount to be applied, or data of an expression to calculate a compensation amount to be applied from a variability of a state of a signal is stored in the memory 127, and the compensation amount corresponding to the derived variability of the state of the signal is specified by using the correspondence table or the expression. When the variability includes the change mode, for example, correspondence tables or expressions corresponding to respective types are prepared. Incidentally, also described later, the correspondence table or the expression may be recorded on the optical disk 150, not the memory 127, and may be read from the optical disk 150.

For example, a system may be adopted in which with respect to the optical disk 150 having high playback degradation, it is necessary to reduce the playback laser power level; however, with respect to the optical disk 150 having little playback degradation, the laser power level is not much reduced. Specifically, as shown in the graph of FIG. 4 (the vertical axis represents the compensation amount of playback power, and the horizontal axis represents the amount of signal state transition), the relation between the amount of signal state transition and the compensation amount of playback power is expressed by a downward-sloping curve. This is because, since it is assumed that the compensation amount is added to the normal playback condition, it becomes large in the negative direction. That is, when the amount of signal state transition increases, the absolute value of the compensation amount of playback power increases. When the amount of signal state transition is a threshold or less, it is unnecessary to change the playback power, and therefore, the compensation amount is 0. When the compensation amount is made excessively large, the C/N ratio of the playback signal at the data playback deteriorates, and therefore, it is preferable that the upper limit of the compensation is also set. Incidentally, the curve shown in the graph of FIG. 4 is merely an example, and there is also a case where the compensation amount is represented by another shape curve.

Besides, a system may be adopted in which with respect to the optical disk 150 having high playback degradation, the rotational speed or the rotating speed of the spindle motor 133 is increased to shorten the time of laser irradiation, and with respect to the optical disk 150 having little playback degradation, the rotational speed of the spindle motor 133 is not increased very much. Specifically, as shown in the graph of FIG. 5 (the vertical axis represents the compensation amount of rotational speed of playback spindle, and the horizontal axis represents the amount of signal state transition), the relation between the amount of signal state transition and the compensation amount of rotational speed of playback spindle is expressed by an upward-sloping curve. Incidentally, when the amount of signal state transition is a threshold or less, it is unnecessary to change the rotational speed of the spindle motor 133, and therefore, the compensation amount is 0. When the compensation amount is made excessively large, the C/N ratio of the playback signal at the data playback deteriorates, and therefore, it is preferable that the upper limit of the compensation amount is also set. Incidentally, the curve shown in the graph of FIG. 5 is merely an example, and there is also a case where the compensation amount is expressed by another shape curve.

As stated above, although the playback condition is the laser power level at the playback or the rotational speed of the spindle motor 133, another playback condition may be adjusted. Besides, the relation as shown in FIG. 4 or FIG. 5 may be held as data in a table form or in an expression form.

The controlling circuit 125 sets the playback condition, in which the specified compensation amount of the playback condition is reflected on the normal playback condition, in the LD driver 121 or the servo controlling circuit 132 (step S11). That is, the compensation amount is added to the normal playback condition to specify the playback condition for subsequent data playback. When the laser power level is the playback condition, the specified playback condition is set in the LD driver 121. When the rotational speed of the spindle motor 133 is the playback condition, the specified playback condition is set in the servo controlling circuit 132.

The process as stated above may be performed before the data playback is performed, so that the playback degradation can be prevented or suppressed. That is, the playback durability of the data writable optical disk 150 can be ensured.

Embodiment 2

A functional block diagram of a drive system of a second embodiment of the invention is the same as that of the first embodiment shown in FIG. 1. However, a process as shown in FIG. 6 is performed.

First, the user sets an optical disk 150 (optical disk on which data can be written at least once) to an optical disk drive device 100. A controlling circuit 125 reads initialization information, such as a data playback position (for example, a specified track in a test area), a laser power level and a rotational speed of a spindle motor 133, previously stored in a memory 127 or the like, and sets it in an LD driver 121, a servo controlling circuit 132 and the like (step S21). Although the laser power level is set to a value lower than a recording laser power level, that is, a mark formation level, it is preferable that a value higher than a normal playback laser power level is adopted. Besides, a specified code may not be written at the data playback position.

Next, the controlling circuit 125 causes the LD driver 121 to start laser irradiation to the data playback position (step S23). The laser irradiation is continuously performed. When the laser irradiation is started, a return (reflected) light from the optical disk 150 is converted into an electric signal by a PD 112, and is outputted to a characteristic value detection unit 124. The characteristic value detection unit 124 detects a state of a signal caused by the return light, and outputs it to the controlling circuit 125, and the controlling circuit 125 stores it in the memory 127 (step S25). The state of the signal is the same as that explained in the first embodiment. First, the state of the signal immediately after step S23 is detected as a state of a reference signal or a state of an initial signal. Besides, measurement of an elapsed time or counting of a laser irradiation frequency is started from the first execution of step S23.

The controlling circuit 125 determines whether the elapsed time reaches a specified time or the laser irradiation frequency reaches a specified number of times (step S27). When the elapsed time does not reach the specified time, or the laser irradiation frequency does not reach the specified number of times, return is made to step S25. On the other hand, when the elapsed time reaches the specified time, or the laser irradiation frequency reaches the specified number of times, the controlling circuit 125 causes the LD driver 121 to end the laser irradiation. The controlling circuit 125 derives a variability of the detected state of the signal (step S29). Specifically, a difference between a first voltage level as the state of the reference signal (the state of the initial signal) and a second voltage level as a state of a signal (a second state of a signal) after the specified time elapses, that is, a variation or a rate of change is calculated. For example, the rate of change may be calculated as (first voltage level−second voltage level)/(first voltage level). As described in the first embodiment, the change mode of the state of the signal may also be determined.

Thereafter, the controlling circuit 125 specifies a compensation amount of a playback condition corresponding to the derived variability of the state of the signal (step S31). For example, a correspondence table of a variability of a state of a signal and a compensation amount to be applied, or data of an expression to calculate a compensation amount to be applied from a variability of a state of a signal is stored in the memory 127, and the compensation amount corresponding to the derived variability of the state of the signal is specified by using the correspondence table or the expression. When the variability includes the change mode, for example, correspondence tables or expressions corresponding to respective types are prepared. Incidentally, the correspondence table or the expression may be recorded on the optical disk 150, not the memory 127, and may be read from the optical disk 150. Step S31 is also similar to step S9 in the first embodiment.

Similarly to the first embodiment, the playback condition is the laser power level at playback or the rotational speed of the spindle motor 133, however, another playback condition may be adjusted.

The controlling circuit 125 sets the playback condition, in which the specified compensation amount of the playback condition is reflected on the normal playback condition, in the LD driver 121 or the servo controlling circuit 132 (step S33). That is, the compensation amount is added to the normal playback condition to specify the playback condition for subsequent data playback. When the laser power level is the playback condition, the playback condition is set in the LD driver 121. When the rotational speed of the spindle motor 133 is the playback condition, the playback condition is set in the servo controlling circuit 132.

The process as stated above may be performed before the data playback is performed, so that the playback degradation can be prevented or suppressed. That is, the playback durability of the data writable optical disk 150 can be ensured.

Embodiment 3

A functional block diagram of a drive system of a third embodiment of the invention is the same as that of the first embodiment shown in FIG. 1. However, a process as shown in FIG. 7 is performed.

First, the user sets an optical disk 150 (optical disk on which data can be written at least once) to an optical disk drive device 100. A controlling circuit 125 reads initialization information, such as a data playback position (for example, a specified track in a test area), a laser power level and a rotational speed of a spindle motor 133, previously stored in a memory 127 or the like, and sets it in an LD driver 121, a servo controlling circuit 132 and the like (step S41). Although the laser power level is set to a value lower than a recording laser power level, that is, a mark formation level, it is preferable that a value higher than a normal playback laser power level is adopted. Besides, a specified code may not be written at the data playback position.

Next, the controlling circuit 125 causes the LD driver 121 to start laser irradiation to the foregoing data playback position (step S43). The laser irradiation is continuously performed. When the laser irradiation is started, a return (reflected) light from the optical disk 150 is converted into an electric signal by a PD 112, and is outputted to a characteristic value detection unit 124. The characteristic value detection unit 124 detects a state of a signal caused by the return light, and outputs it to the controlling circuit 125, and the controlling circuit 125 stores it in a memory 127 (step S45). The state of the signal is the same as that explained in the first embodiment. First, the state of the signal immediately after step S43 is detected as a state of a reference signal or a state of an initial signal. Besides, measurement of an elapsed time or counting of a laser irradiation frequency is started from the first execution of step S43.

The controlling circuit 125 determines whether the state of the signal reaches a target level (step S47). In the case of the Low-to-High optical disk 150, the target level is a level in which a specified rate α (for example, 5%) is added to the state of the reference signal. In the case of the High-to-Low optical disk 150, the target level is a level in which the state of the reference signal is reduced by the specified rate α. That is, it is determined whether the playback degradation occurs, and whether the state of the signal is changed from the state of the reference signal by the specified rate α or more.

When the state of the signal does not reach the target level, the controlling circuit 125 determines whether the elapsed time reaches a specified time or the laser irradiation frequency reaches a specified number of times (step S49). When the elapsed time does not reach the specified time or the laser irradiation frequency does not reach the specified number of times, return is made to step S45. On the other hand, when the elapsed time reaches the specified time or the laser irradiation frequency reaches the specified number of times, since the playback degradation is low, even if the specified time or the specified number of times is attained, the state of the signal is not changed to the target level. In that case, the laser irradiation is stopped and shift is made to step S51.

When the state of the signal reaches the target level, the controlling circuit 125 causes the LD driver 121 to end the laser irradiation. The controlling circuit 125 derives a playback durability index of the optical disk 150 (step S51), as will be described below.

As indicated by a curve "a" or "b" in the graph of FIG. 8 (the vertical axis represents normalized voltage, and the horizontal axis represents time or frequency), in the case of the Low-to-High optical disk 150, when the playback degradation occurs, as the laser irradiation time or the frequency increases, the voltage rises. In the case of the optical disk 150 which is liable to be subjected to playback degradation, as indicated by the curve "b", a time "b" (called degradation time) or a frequency "b" (called deterioration frequency) required to reach the target level (for example, 1+α) becomes short. On the other hand, in the case of the optical disk 150 which is not easily subjected to playback degradation, as indicated by the curve "a", the degradation time "a" or the deterioration frequency "a" required to reach the target level (for example, 1+α) becomes larger. Accordingly, the degradation time and/or the deterioration frequency can be used as a playback durability index. Also in the case of the High-to-Low optical disk 150, the degradation time and/or the deterioration frequency can be used as the playback durability index.

However, when it is determined at step S49 that the specified time or the specified frequency is attained, a value obtained by adding a suitable value (which may include 0) to the specified time or the specified frequency may be used as a degradation time or a deterioration frequency.

Thereafter, the controlling circuit 125 specifies a compensation amount of a playback condition corresponding to the derived playback durability index (step S53). For example, a correspondence table of a playback durability index and a compensation amount to be applied, or data of an expression to calculate a compensation amount to be applied from a playback durability index is stored in the memory 127, and the compensation amount corresponding to the derived playback durability index is specified by using the correspondence table or the expression. Incidentally, the correspondence table or the expression may be recorded on the optical disk 150, not the memory 127, and may be read from the optical disk 150.

When the playback condition is the laser power, the compensation amount as shown in FIG. 9 is specified. In the graph of FIG. 9, the vertical axis represents the compensation amount of playback power, and the horizontal axis represents playback durability index. As shown in the figure, as the playback durability index becomes a small value, the absolute value of the compensation amount of the playback power becomes large. When the playback durability index increases, the absolute value of the compensation amount of the playback power decreases proportionally, and when the playback durability index increases to a certain degree, the compensation amount of the playback power becomes 0. Incidentally, when the compensation amount is made excessively large, the C/N ratio of the playback signal at data playback deteriorates, and therefore, it is preferable that the upper limit of the compensation amount is also set. Incidentally, the curve of FIG. 9 is merely an example, and there is also a case where the compensation amount is expressed by another shape curve.

When the playback condition is the rotational speed or the rotating speed of the spindle motor 133, the compensation amount as shown in FIG. 10 is specified. In FIG. 10, the vertical axis represents the compensation amount of rotational speed of playback spindle, and the horizontal axis represents playback durability index. As shown in the figure, when the playback durability index becomes a small value, the compensation amount of rotational speed of playback spindle becomes a large value. When the playback durability index increases, the compensation amount of rotational speed of playback spindle approaches 0 according to that. When the playback durability index increases to a certain degree, the compensation amount of rotational speed of playback spindle becomes 0. Incidentally, when the compensation amount is made excessively large, the C/N ratio of the playback signal at data playback deteriorates, and therefore, it is preferable that the upper limit of the compensation amount is also set. Incidentally, the curve of FIG. 10 is an example, and there is also a case where the compensation amount is expressed by another shape curve.

The controlling circuit 125 sets the playback condition, in which the specified compensation amount of the playback condition is reflected, in the LD driver 121 or the servo controlling circuit 132 (step S55). That is, the compensation amount is added to the normal playback condition to specify the playback condition for subsequent data playback. When the laser power level is the playback condition, the playback condition is set in the LD driver 121. When the rotational speed of the spindle motor 133 is the playback condition, the playback condition is set in the servo controlling circuit 132.

The process as stated above may be performed before the data playback is performed, so that the playback degradation can be prevented or suppressed. That is, the playback durability of the data writable optical disk 150 can be ensured.

Embodiment 4

A functional block diagram of a drive system of a fourth embodiment of the invention is the same as that of the first embodiment shown in FIG. 1. In the first to the third embodiments, a laser beam is irradiated to an area where data is not recorded, and the degree of playback degradation can be artificially specified when no recording is performed. In this embodiment, a method is described in which test recording is performed to actually write a specified code, and playback is performed to actually specify the degree of playback degradation. Hereinafter, a process will be described with reference to FIG. 11 and FIG. 12. Of course, recording may be performed with the first to third embodiments as well.

First, the user sets an optical disk 150 (optical disk on which data can be written at least once) to an optical disk drive device 100. A controlling circuit 125 reads initialization information, such as a data recording position (for example, a specified track in a test area), a recording laser power level, a playback laser power level, and a rotational speed of the spindle motor 133, previously stored in a memory 127 or the like, and sets it in an LD driver 121, a servo controlling circuit 132 and the like (step S61). Although the playback laser power level is set to a value lower than a recording laser power level, that is, a mark formation level, it is preferable that a value higher than a normal playback laser power level is adopted.

Next, the controlling circuit 125 outputs a specified sign row to a data modulator circuit 129, and causes the specified sign row to be recorded on a specified track of the optical disk 150 through the LD driver 121 and an LD 111 (step S63).

The controlling circuit 125 causes the LD driver 121 to start laser irradiation to the specified track at the playback laser power level which is set as described above and to start data playback (step S65). The laser irradiation is continuously performed. When the laser irradiation is started, a return (reflected) light from the optical disk 150 is converted into an electric signal by a PD 112, and is outputted to a characteristic value detection unit 124. The characteristic value detection unit 124 detects a signal state of a playback signal caused by the return light and outputs it to the controlling circuit 125.

For example, voltage levels of playback signals (2T to 8T signs) in the case of Low-to-High of Blu-ray standards are as shown in FIG. 12. In FIG. 12, the vertical axis represents voltage, and the horizontal axis represents time. In the case of the Low-to-High type, when a 2T mark is played back, a I2H level can be obtained, and when a 2T space is played back, a I2L level can be obtained. When a 3T mark is played back, a I3H level can be obtained, and when a 3T space is played back, a I3L level can be obtained. When a 8T mark is played back, a I8H level can be obtained, and when a 8T space is played back, a I8L level can be obtained. When playback degradation occurs by repeatedly performing the data playback, similarly to the first to the third embodiments, these voltage levels are changed to the high voltage side when the optical disk 150 is of the Low-to-High type, or are changed to the low voltage side when the optical disk 150 is of the Low-to-High type. Incidentally, the variation amount often varies according to the sign, the balance between the signs is lost, and the recording quality deteriorates. Then, for example, with respect to one sign, a voltage level (also called an amplitude level) is detected by the characteristic value detection unit 124, and may be directly adopted as a signal state evaluation index. Voltage levels are detected with respect to plural signs, an operation is performed on those values, and a signal state evaluation value may be calculated.

Besides, in addition to the simple voltage level, an evaluation index such as a $\beta$ value, an asymmetry value, a jitter value or an error value known to those skilled in the art may be adopted as the signal state evaluation index. In such a case, characteristic values required to calculate such known values by the controlling circuit 125 are detected by the characteristic value detection unit 124, and are outputted to the controlling circuit 125.

The controlling circuit 125 uses the output from the characteristic value detection unit 124, calculates a previously determined signal state evaluation index, and stores it in the memory 127 (step S67). The value of the signal state evaluation index calculated immediately after step S65 is performed is treated as a reference value or a starting value.

Besides, measurement of an elapsed time or counting of a laser irradiation frequency is started from the execution of step S65.

The controlling circuit 125 determines whether the elapsed time reaches a specified time or the laser irradiation frequency reaches a specified number of times (step S69). When the elapsed time does not reach the specified time, or the laser irradiation frequency does not reach the specified number of times, return is made to step S67. On the other hand, when the elapsed time reaches the specified time, or the laser irradiation frequency reaches the specified number of times, the controlling circuit 125 causes the LD driver 121 to end the laser irradiation. The controlling circuit 125 derives the variability of the signal state evaluation index (step S71). Specifically, a difference between the reference value (state of an initial signal) of the signal state evaluation index and the value (state of a second signal) of the signal state evaluation index calculated at step S67 performed lastly, that is, a variation or a rate of change is calculated. For example, a rate of change may be calculated as (the state of the initial signal−the state of the second signal)/(the state of the initial signal). Also, a change mode, such as a shape of a change curve of a signal state evaluation index, may also be specified.

Thereafter, the controlling circuit 125 specifies a compensation amount of a playback condition corresponding to the derived variability of the signal state evaluation index (step S73). For example, a correspondence table of a variability of a signal state evaluation index and a compensation amount to be applied, or data of an expression to calculate a compensation amount to be applied from a variability of a signal state evaluation index is stored in the memory 127, and the compensation amount corresponding to the derived variability of the signal state evaluation index is specified by using the correspondence table or the expression. When the variability includes the change mode, correspondence tables or expressions corresponding to respective types are prepared. Incidentally, the correspondence table or the expression may be recorded on the optical disk 150, not the memory 127, and may be read from the optical disk 150.

Similarly to the first embodiment, the playback condition is the laser power level at playback or the rotational speed of the spindle motor 133. Accordingly, the relation between the amount of the signal state transition and the compensation amount of the playback power shown in FIG. 4 is similar to the relation between the variability of the signal state evaluation index and the compensation amount of the playback power. Similarly, the relation between the amount of the signal state transition and the compensation amount of the rotational speed of the playback spindle shown in FIG. 5 is similar to the relation between the variability of the signal state evaluation index and the compensation amount of the rotational speed of the playback spindle.

Similarly to the first embodiment, although the playback condition is the laser power level at playback or the rotational speed of the spindle motor 133, another playback condition may be adjusted.

The controlling circuit 125 sets the playback condition, in which the specified compensation amount of the playback condition is reflected on the normal playback condition, in the LD driver 121 or the servo controlling circuit 132 (step S75). That is, the compensation amount is added to the normal playback condition to specify the playback condition for subsequent data playback. When the laser power level is the playback condition, the playback condition is set in the LD driver 121. When the rotational speed of the spindle motor 133 is the playback condition, the playback condition is set in the servo controlling circuit 132.

The process as stated above may be performed before the data playback is performed, so that the playback degradation can be prevented or suppressed. That is, the playback durability for the data writable optical disk 150 can be ensured.

Embodiment 5

A functional block diagram of a drive system of a fifth embodiment of the invention is the same as that of the first embodiment shown in FIG. 1. Also in this embodiment, test recording is performed to actually write a code, and playback is performed to actually specify the degree of playback degradation. Hereinafter, a process will be described with reference to FIG. 13.

First, the user sets an optical disk 150 (optical disk on which data can be written at least once) to an optical disk drive device 100. A controlling circuit 125 reads initialization information, such as a data recording position (for example, a specified track in a test area), a recording laser power level, a playback laser power level, and a rotational speed of the spindle motor 133, previously stored in a memory 127 or the like, and sets it in an LD driver 121, a servo controlling circuit 132 or the like (step S81). Although the playback laser power level is set to a value lower than a recording laser power level, that is, a mark formation level, it is preferable that a value higher than a normal playback laser power level is adopted.

Next, the controlling circuit 125 outputs a specified sign row to a data modulator circuit 129, and causes the specified sign row to be recorded on the specified track of the optical disk 150 through the LD driver 121 and an LD 111 (step S83).

The controlling circuit 125 causes the LD driver 121 to start laser irradiation to the specified track at the playback laser power level which is set as described above and to start data playback (step S85). The laser irradiation is continuously performed. When the laser irradiation is started, a return (reflected) light from the optical disk 150 is converted into an electric signal by the PD 112, and is outputted to a characteristic value detection unit 124. The characteristic value detection unit 124 detects a signal state of a playback signal caused from the return light and outputs it to the controlling circuit 125. This process is the same as that of step S65 of the fourth embodiment. That is, for example, a voltage level is detected by the characteristic value detection unit 124 with respect to one sign, and may be directly used as the signal state evaluation index. Voltage levels are detected with respect to plural signs, and an operation may be performed on those values to calculate the signal state evaluation value. Besides, in addition to the simple voltage level, an evaluation index such as a β value, an asymmetric value, a jitter value, or an error rate value known to those skilled in the art may be adopted as the signal state evaluation index.

The controlling circuit 125 uses the output from the characteristic value detection unit 124, calculates the previously determined signal state evaluation index, and stores it in the memory 127 (step S87). The value of the signal state evaluation index calculated immediately after step S85 is performed is treated as the reference value or the starting value of the signal state evaluation index.

Besides, measurement of an elapsed time or counting of a laser irradiation frequency is started from the execution of step S85.

The controlling circuit 125 determines whether the value of the signal state evaluation index reaches a target level (step S89). In the case of the signal state evaluation index which increases when the playback degradation advances, the target level is a level in which a specified rate a (for example, 5%) is added to the reference value of the signal state evaluation index. In the case of the signal state evaluation index which decreases when the playback degradation advances, the target level is a level in which the reference value of the signal state evaluation index is reduced by the specified rate $\alpha$. That is, it is determined whether the playback degradation occurs and whether the state of the signal is changed from the reference value of the signal state evaluation index by the specified rate a or more.

When the value of the signal state evaluation index does not reach the target level, the controlling circuit 125 determines whether the elapsed time reaches a specified time or the laser irradiation frequency reaches a specified number of times (step S91). When the elapsed time does not reach the specified time or the laser irradiation frequency does not reach the specified number of times, return is made to step S87. On the other hand, when the elapsed time reaches the specified time or the laser irradiation frequency reaches the specified number of times, the playback degradation is low, and even if the specified time or the specified number of times is attained, the state of the signal does not change to the target level. In such a case, the laser irradiation is stopped and shift is made to step S93.

When the value of the signal state evaluation index reaches the target level, the controlling circuit 125 causes the LD driver 121 to end the laser irradiation. The controlling circuit 125 derives the playback durability index of the optical disk 150 (step S93). With respect to the playback durability index, the same way of thinking as that of the third embodiment is adopted. That is, there are properties that the value of the signal state evaluation index reaches the target level quickly when the playback degradation is high, and the value of the signal state evaluation index does not reach the target level quickly when the playback degradation is low. Thus, the degradation time as the time required to reach the target level or the deterioration frequency as the laser irradiation frequency required to reach the target level is adopted as the playback durability index.

However, when it is determined at step S91 that the specified time or the specified number of times is attained, a value obtained by adding a suitable value (which may include 0) to the specified time or the specified number of times may be used as the degradation time or the deterioration frequency.

Thereafter, the controlling circuit 125 specifies the compensation amount of the playback condition corresponding to the derived playback durability index (step S95). For example, a correspondence table of a playback durability index and a compensation amount to be applied, or data of an expression to calculate a compensation amount to be applied from a playback durability index is stored in the memory 127, and the compensation amount corresponding to the derived playback durability index is specified by using the correspondence table or the expression. Incidentally, the correspondence table or the expression may be recorded on the optical disk 150, not the memory 127, and may be read from the optical disk 150. This process is the same as that of step S53 of the third embodiment. That is, when the playback condition is the laser power level, the absolute value of the compensation amount is made to become large as the value of the playback durability index becomes small, and the compensation amount is made to approach 0 as the value of the playback durability index becomes large. When the playback condition is the rotational speed of the spindle motor 133, the compensation amount of the rotational speed of the playback spindle becomes a large value as the playback durability index becomes a small value, and the compensation amount of the rotational speed of the playback spindle approaches 0 as the playback durability index increases.

The controlling circuit 125 sets the playback condition, in which the specified compensation amount of the playback condition is reflected, in the LD driver 121 or the servo controlling circuit 132 (step S97). That is, the compensation amount is added to the normal playback condition to specify the playback condition for subsequent data playback. When the laser power level is the playback condition, the playback condition is set in the LD driver 121. When the rotational speed of the spindle motor 133 is the playback condition, the playback condition is set in the servo controlling circuit 132.

The process as stated above may be performed before the data playback is performed, so that the playback degradation can be prevented or suppressed. That is, the playback durability for the data writable optical disk 150 can be ensured.

Other Embodiment

In the foregoing embodiments, the laser irradiation is continuously performed, the change of the playback signal is detected and the various processes are performed. However, the process may take a relatively long time. Then, values corresponding to the variability at step S7 (first embodiment) or S29 (second embodiment), the playback durability index at step S51 (third embodiment) or step S93 (fifth embodiment), and the variability of the signal state evaluation index at step S71 (fourth embodiment) are stored in the memory 127 of the optical disk drive device 100, and the values may be read and used. Besides, these values may be stored for each type of the optical disk 150. Similarly, values on the optical disk 150 may be recorded of the optical disk 150.

Further, the compensation amount itself of the playback condition or the playback condition itself after the compensation may be stored in the memory 127 or the optical disk 150.

Besides, the rate for determining the target level, or the value of the specified time or the specified number of times may also be stored in the memory 127 or the optical disk 150.

As described above, when data is held on the optical disk 150, it may be held in a Lead-in area as shown in FIG. 14. The Lead-in area is roughly divided into a system Lead-in area, a connection area and a data Lead-in area. The system Lead-in area includes an initial zone, a buffer zone, a control data zone, and a buffer zone. The connection area includes a connection zone. Further, the data Lead-in area includes a guard track zone, a disk test zone, a drive test zone, a guard track zone, an RMD duplication zone, a recording management zone, an R-physical format information zone, and a reference code zone. In this embodiment, the control data zone of the system Lead-in area includes a recording condition data zone 170. For example, the data as described above are held in the recording condition data zone 170.

Although embodiments of the invention are described above, the invention is not limited to these. For example, the functional block diagram of FIG. 1 is for explaining the embodiments, and is not always coincident with the actual circuit and module constitution. Besides, with respect to the process flow, when the processing result is the same, the processing order may be exchanged, or the processing may be executed in parallel.

The structure and the operation of the present invention are not limited to the above descriptions. Various modifications may be made without departing from the spirit and scope of the present invention. While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of controlling a playback condition, comprising:
    irradiating a track of an optical disk where no data is recorded with a laser beam having a power level lower than a mark formation level and higher than a playback laser power level;
    detecting a state of an initial signal as a first state of a signal representing a reflectivity level caused by a return light reflected from the track of the optical disk where no data is recorded;
    continuously irradiating the track of the optical disk where no data is recorded with a laser beam having a power level lower than the mark formation level and higher than a playback laser power level;
    detecting a state of a second signal as a second state of a signal representing a reflectivity level caused by a return light reflected from the track where no data is recorded of the optical disk during the continuous irradiating;
    calculating a variation or a rate of change of a state of a signal representing a reflectivity level based on the first state of the initial signal and the second state of the second signal;
    specifying a compensation amount of a playback condition corresponding to a time between detecting the first state and detecting the second state or corresponding to a laser irradiation frequency when the variation or the rate of change of the state of the signal exceeds a threshold; and
    setting a playback condition in which the specified compensation amount of the playback condition is reflected.

2. The method according to claim 1, wherein the optical disk is a High-to-Low optical disk.

3. The method according to claim 1, wherein all the steps are performed before playback is performed.

4. An optical disk drive device, comprising:
    a unit configured to execute a first detection process of irradiating a track of an optical disk where no data is recorded with a laser beam having a power level lower than a mark formation level and higher than a playback laser power level and detecting a state of an initial signal as a first state of a signal representing a reflectivity level caused by a return light reflected from the track of the optical disk where no data is recorded, and configured to execute a second detection process of continuously irradiating the track of the optical disk with a laser beam having a power level lower than the mark formation level and higher than a playback laser power level and detecting a state of a second signal as a second state of a signal representing a reflectivity level caused by a return light reflected from the track of the optical disk where no data is recorded during the continuous irradiation;
    a unit configured to calculate a variation or a rate of change of a state of a signal representing a reflectivity level based on the first state of the initial signal and the second state of the second signal;

a unit configured to specify the compensation amount of a playback condition corresponding to a time between the first detection process and the second detection process or corresponding to a laser irradiation frequency when the variation or the rate of change of the state of the signal exceeds a threshold; and a unit configured to set a playback condition in which the specified compensation amount of the playback condition is reflected.

5. The optical disk drive device according to claim 4, wherein the optical disk is a High-to-Low optical disk.

6. A non-transitory computer readable medium storing executable instructions for causing a computer to execute the steps of:

irradiating a track of an optical disk where no data is recorded with a laser beam having a power level lower than a mark formation level and higher than a playback laser power level;

detecting a state of an initial signal as a first state of a signal representing a reflectivity level caused by a return light reflected from the track of the optical disk where no data is recorded;

continuously irradiating the track of the optical disk where no data is recorded with a laser beam having a power level lower than the mark formation level and higher than a playback laser power level;

detecting a state of a second signal as a second state of a signal representing a reflectivity level caused by a return light reflected from the track of the optical disk where no data is recorded during the continuous irradiating;

calculating a variation or a rate of change of a state of a signal representing a reflectivity level based on the state of the initial signal and the state of the second signal;

specifying a compensation amount of a playback condition corresponding to a time between detecting the first state and detecting the second state or corresponding to the laser irradiation frequency when the variation or the rate of change of the state of the signal exceeds a threshold; and setting a playback condition in which the specified compensation amount of the playback condition is reflected.

7. The non-transitory computer readable medium according to claim 6, wherein the optical disk is a High-to-Low optical disk.

* * * * *